United States Patent
Butvinik et al.

(10) Patent No.: US 12,141,806 B2
(45) Date of Patent: Nov. 12, 2024

(54) CLUSTERING-BASED DATA SELECTION FOR OPTIMIZATION OF RISK PREDICTIVE MACHINE LEARNING MODELS

(71) Applicant: Actimize LTD., Ra'anana (IL)

(72) Inventors: Danny Butvinik, Haifa (IL); Maria Zatsepin, Qyriat Ono (IL); Yoav Avneon, Ness-Zyiona (IL)

(73) Assignee: ACTIMIZE LTD., Ra'anana (IL)

( * ) Notice: Subject to any disclaimer, the term of this patent is extended or adjusted under 35 U.S.C. 154(b) by 837 days.

(21) Appl. No.: 17/334,743

(22) Filed: May 30, 2021

(65) Prior Publication Data

US 2022/0383322 A1 Dec. 1, 2022

(51) Int. Cl.
| | |
|---|---|
| *G06N 20/00* | (2019.01) |
| *G06N 5/04* | (2023.01) |
| *G06Q 20/40* | (2012.01) |
| *G06F 18/214* | (2023.01) |
| *G06F 18/23* | (2023.01) |
| *G06F 18/24* | (2023.01) |

(52) U.S. Cl.
CPC ........... *G06Q 20/4016* (2013.01); *G06N 5/04* (2013.01); *G06N 20/00* (2019.01); *G06F 18/214* (2023.01); *G06F 18/23* (2023.01); *G06F 18/24* (2023.01)

(58) Field of Classification Search
None
See application file for complete search history.

(56) References Cited

U.S. PATENT DOCUMENTS

| | | | | |
|---|---|---|---|---|
| 2014/0258295 | A1* | 9/2014 | Wang | G06F 16/35 707/737 |
| 2019/0377819 | A1* | 12/2019 | Filliben | G06N 3/084 |
| 2020/0065814 | A1* | 2/2020 | Fang | G06Q 20/4014 |
| 2020/0175421 | A1* | 6/2020 | Zhou | G06F 18/2451 |
| 2020/0327456 | A1* | 10/2020 | Sathe | G06F 18/24 |

\* cited by examiner

*Primary Examiner* — Xuyang Xia
(74) *Attorney, Agent, or Firm* — SOROKER AGMON NORDMAN RIBA (57) ABSTRACT

A risk-prediction-preparation module to generate a risk-prediction-model, is provided herein. The risk-prediction-preparation module includes accessing a data-storage of transactions to operate a group-by operation on transactions related to data-points, according to a logical-entity into entities. Then, clustering entities of a clean-financial dataset into clusters. Selecting data-points of: (a) entities from the clusters to a first dataset and (b) a preconfigured amount of entities randomly to a second dataset. Selecting all entities that have at least one 'fraudulent' data-points in at least one related data-point to add all the entities to the first dataset and the second dataset. Using vectorized and scaled extracted features for training a first machine-learning-model of fraud detection on the first dataset and training a second machine-learning-model of fraud detection on the second dataset to collect results. Using the results for combining the first machine-learning-model and the second machine-learning-model to an ensemble machine-learning-model for risk-prediction.

21 Claims, 4 Drawing Sheets

CLUSTERING-BASED DATA SELECTION FOR OPTIMIZATION OF RISK PREDICTIVE MACHINE LEARNING MODELS

TECHNICAL FIELD

The present disclosure relates to the field of Machine Learning (ML) algorithms, prediction optimization, sampling, and optimized and representative training dataset for predictive models of rare events.

BACKGROUND

Money Service Businesses (MSBs) serve a critical role in the financial world by providing access to money transfer services. In MSBs customers are largely anonymous which makes them targets for money laundering, terrorist financing and other suspicious activity.

Technology may be applied to provide financial crime detection, fraud risk assessment and compliance solutions for regional and global financial institutions, as well as government regulators to protect financial institutions and safeguard consumers and investors assets.

Fraud events are rare and therefore the detection of these rare events by algorithms is known to be complicated, due to an unbalanced representation of True and False events. The unbalanced representation makes it harder for the Machine Learning (ML) Models to accurately detect potential true labels because they are rare. Rare events in the financial world may be financial frauds and/or suspicious activity.

Knowledge engineering involves designing a set of rules that matches an event or by explicitly eliciting knowledge from an expert about how they determine the event. Predictive Machine Learning (ML) models for rare events, requires knowledge engineering, such as preparation and optimized selection of the learning dataset for better performance and detection of the ML models.

High rates of falsely detected features or events may result with either additional work on optimization of the ML models or with human resources for manual verification of the wrongly classified transaction. The accuracy and effectiveness of the ML model is determined among other things, by the training dataset. Therefore, it is significant to train the ML model on a suitable and representative learning dataset.

Due to delivery and production needs of ML models over big data, the predictive ML models must be trained on a smaller selected subset of the big data. Optimally, such selected subset is a well representation of the entire population, i.e. big data. The selected training dataset, which is a subset of big data may be retrieved by a sampling algorithm. However, sampling algorithms that generate a training dataset out of large-scale data for machine learning models, commonly consume large amount of computational resources, such as memory and storage space.

Moreover, clustering algorithms may yield better models from a better representation of the population in the sampled data.

There is a need to improve the rates of wrongly classified entries i.e., transactions, by a ML prediction model. Accordingly, there is a need in a technical solution that may implement a comparative analysis of models by testing on random and selected data points from clusters of input data. There is a need to detect the miss-classified transactions based on hidden behaviors of clean, i.e., 'non-fraudulent' transactions that can be detected indirectly by a clustering algorithm.

Clustering is a widely applied methodology for dividing data into logical groups based on similarity of inner parameters of the groups. Using clustering, while embedding human knowledge e.g., grouping by logical entities, for selection of training dataset from the available data which can't be used as input for the MLs due to space and time complexity limitations, promotes input optimization and results with improvement of the performance of the ML detection algorithms.

Furthermore, there is a need for a technical solution that will provide sampling of big-data, based on a clustering technique that is related to the similarity and differences between different entities such as accounts, cards parties and the like. Such clustered-based selection may yield a more representative input data for the ML prediction models, thus optimizing the ML prediction models' performance.

SUMMARY

There is thus provided, in accordance with some embodiments of the present disclosure, a computerized-method for generating a risk prediction model.

In accordance with some embodiments of the present disclosure, in a computerized system comprising a processor and a memory, providing to the processor access to a data storage of transactions having data points labeled as 'non-fraudulent' and data points labeled as 'fraudulent' and operating by the processor a risk-prediction-preparation module.

Furthermore, in accordance with some embodiments of the present disclosure, the processor may operate risk-prediction-preparation module. The operating of the risk-prediction-preparation module may include accessing the data storage of transactions to operate a group by operation on transactions related to the data points, according to a logical entity into entities and filtering entities having no 'fraudulent' data point into a clean-financial dataset. Then, clustering, by a clustering model, entities of the clean-financial dataset into one or more preconfigured number of clusters. Each cluster in the one or more preconfigured number of clusters has one or more data points labeled as 'non-fraudulent.

Furthermore, in accordance with some embodiments of the present disclosure, the operating of the risk-prediction-preparation module may further include selecting data points of: (a) entities from the one or more preconfigured number of clusters to a first dataset and (b) a preconfigured amount of entities randomly to a second dataset and then selecting all entities that have at least one 'fraudulent' data point in at least one related data point to add all the entities to the first dataset and the second dataset. Thus, yielding a first dataset having all entities that have at least one 'fraudulent' data point in at least one related data point and data points from the one or more preconfigured number of clusters and a second dataset having all entities that have at least one 'fraudulent' data point in at least one related data point and data points of the preconfigured amount of entities randomly selected. Each entity includes one or more data points.

Furthermore, in accordance with some embodiments of the present disclosure, the operating of the risk-prediction-preparation module may further include performing feature engineering on data points in the data storage of transactions to extract features, wherein the extracted features are vectorized and scaled and then using the vectorized and scaled extracted features for training a first machine learning model of fraud detection on the first dataset and training a second machine learning model of fraud detection on the second dataset to collect results.

Furthermore, in accordance with some embodiments of the present disclosure, the operating of the risk-prediction-preparation module may further include using the results of the training of the first machine learning model and the results of the second machine learning model for combining the first machine learning model and the second machine learning model to an ensemble machine learning model for risk prediction according to a preconfigured approach.

Furthermore, in accordance with some embodiments of the present disclosure, the logical entity may be determined by a domain expert.

Furthermore, in accordance with some embodiments of the present disclosure, the extracted features are selected from at least one of: key, numeric, categorical and time.

Furthermore, in accordance with some embodiments of the present disclosure, the selected data points of the first dataset and the second dataset may be used as a representative dataset for the risk prediction model.

Furthermore, in accordance with some embodiments of the present disclosure, the computerized-method further may include operating the risk prediction model in production environment on a stream of financial transactions to display, via a display unit, financial transactions that the risk prediction model identifies as 'risky'.

Furthermore, in accordance with some embodiments of the present disclosure, the preconfigured number of clusters out of the one or more clusters may be performed according to a Grid-Search with Cross-Validation pipeline, using an accuracy score function for classification over the clustering with different hyper-parameters.

Furthermore, in accordance with some embodiments of the present disclosure, the clustering may be iterating one or more times to find the preconfigured number of clusters based on (i) comparison with a Principal component analysis (PCA); and (ii) final model results.

Furthermore, in accordance with some embodiments of the present disclosure, an approach of the selecting of data points may be determined by a domain expert or by a weighted and normalized sampling process.

Furthermore, in accordance with some embodiments of the present disclosure, the clustering may be based on one or more preconfigured meta-parameters.

Furthermore, in accordance with some embodiments of the present disclosure, the one or more preconfigured meta-parameters may be determined based on confusion metrices of trained first and second machine learning models.

Furthermore, in accordance with some embodiments of the present disclosure, for K-Means clustering algorithm the meta-parameters may be Lloyd's or Elkan's, initialization seeds locations, maximum iteration Number of the algorithm for a single run, tolerance. The tolerance may be a relative tolerance with regards to Frobenius norm of difference in the cluster centers of two consecutive iterations to declare convergence, number of initiations. The number of initiations may be a number of time that the k-means clustering algorithm will be run with different centroid seeds.

Furthermore, in accordance with some embodiments of the present disclosure, for other clustering methods than K-Means clustering algorithm, additional meta-parameters may be used such as covariance type for Gaussian Mixture Model (GMM), type of clustering tree algorithm for K-Nearest Neighbors (KNN) algorithm.

Furthermore, in accordance with some embodiments of the present disclosure, the first dataset may be clustered into representing clusters of 'non-fraudulent' data points.

Furthermore, in accordance with some embodiments of the present disclosure, the preconfigured amount of data points from each cluster may be all the data points in the cluster, when the amount of data points in the cluster is below the preconfigured percentage of data points divided by the preconfigured number of clusters and otherwise the preconfigured amount of data points from each cluster may be the preconfigured percentage of data points divided by the preconfigured number of clusters.

Furthermore, in accordance with some embodiments of the present disclosure, the clustering model may be based on a balanced clustering algorithm.

Furthermore, in accordance with some embodiments of the present disclosure, each data point in the data storage may be a record of a financial transaction.

Furthermore, in accordance with some embodiments of the present disclosure, the clustering model may be selected from at least one of K-Nearest Neighbors (KNN) classifier, K-means clustering, spectral clustering, Gaussian Mixture Models (GMM) clustering, hierarchical clustering, Hierarchical Density-Based Spatial Clustering of Applications with Noise (HDBSCAN).

Furthermore, in accordance with some embodiments of the present disclosure, the logical entity may be selected from at least one of: account, card and party or any other unique key identifier.

Furthermore, in accordance with some embodiments of the present disclosure, the preconfigured approach may include: (i) performing analysis of the results of the training of the first machine learning model and the results of the training of the second machine learning model; and (ii) comparing results errors performance and calculating a correction factor for a combined voting of the first machine learning model and the second machine learning model to yield a risk prediction model.

Furthermore, in accordance with some embodiments of the present disclosure, the preconfigured approach may be selected from at least one of: max function, Rectified Linear (ReLU) function, average function, weighted average function or any other function.

Furthermore, in accordance with some embodiments of the present disclosure, the computerized-method may further include: (i) testing the ensemble machine learning model for risk prediction on a set of financial transactions each tagged with a risk score of 'non-fraudulent' or 'fraudulent' to yield a prediction result as to each financial transaction; (ii) comparing the yielded prediction result to a preconfigured threshold to determine the yielded prediction result as 'fraudulent' when the yielded prediction result is above the preconfigured threshold and determine the yielded prediction result as 'non-fraudulent' when the yielded prediction result is below the preconfigured threshold; and (iii) comparing the determined yielded prediction result with the tagged risk score of the financial transaction to find errors in the yielded prediction result of each financial transaction in the set of financial transactions.

There is further provided, in accordance with some embodiments of the present disclosure, a computerized-system for generating a risk prediction model.

Furthermore, in accordance with some embodiments of the present disclosure, the computerized-system may include a processor, a memory, a data storage of transactions having data points labeled as 'non-fraudulent' and data points labeled as 'fraudulent'. The processor may be receiving access to the data storage and configured to operate a risk-prediction-preparation module.

Furthermore, in accordance with some embodiments of the present disclosure, the risk-prediction-preparation module may be configured to access the data storage of transactions to operate a group by operation on entities related to the data points, according to a logical entity into entities and filtering entities having no 'fraudulent' data point into a clean-financial dataset and then cluster, by a clustering model, the entities of the clean-financial dataset into one or more preconfigured number of clusters, wherein each cluster in the one or more preconfigured number of clusters has one or more data points labeled as 'non-fraudulent' and then select data points of: (a) entities from the one or more preconfigured number of clusters to a first dataset and (b) a preconfigured amount of entities randomly to a second dataset.

Furthermore, in accordance with some embodiments of the present disclosure, the risk-prediction-preparation module may be further configured to select all entities that have at least one 'fraudulent' data point in at least one related data point to add all the entities to the first dataset and the second dataset. Thus, yielding a first dataset having all entities that have at least one 'fraudulent' data point in at least one related data point and data points from the one or more preconfigured number of clusters and a second dataset having all entities that have at least one 'fraudulent' data point in at least one related data point and data points of the preconfigured amount of entities randomly selected.

Furthermore, in accordance with some embodiments of the present disclosure, the risk-prediction-preparation module may be further configured to perform feature engineering on data points in the data storage of transactions to extract features, wherein the extracted features are vectorized and scaled.

Furthermore, in accordance with some embodiments of the present disclosure, the risk-prediction-preparation module may be further configured to use the vectorized and scaled extracted features to train a first machine learning model of fraud detection on the first dataset and to train a second machine learning model of fraud detection on the second dataset to collect results; and use the results of the training of the first machine learning model and the results of the second machine learning model to combine the first machine learning model and the second machine learning model to an ensemble machine learning model for risk prediction, according to a preconfigured approach.

BRIEF DESCRIPTION OF THE DRAWINGS

In order for the present invention, to be better understood and for its practical applications to be appreciated, the following Figures are provided and referenced hereafter. It should be noted that the Figures are given as examples only and in no way limit the scope of the invention. Like components are denoted by like reference numerals.

DETAILED DESCRIPTION

In the following detailed description, numerous specific details are set forth in order to provide a thorough understanding of the disclosure. However, it will be understood by those of ordinary skill in the art that the disclosure may be practiced without these specific details. In other instances, well-known methods, procedures, components, modules, units and/or circuits have not been described in detail so as not to obscure the disclosure.

Although embodiments of the disclosure are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes.

Although embodiments of the disclosure are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, use of the conjunction "or" as used herein is to be understood as inclusive (any or all of the stated options).

As used herein, the terms "model" and "approach" are interchangeable.

As used herein, the term "transaction" refers to an event that is conducted between two sides.

As used herein, the term "entity" refers to any one or more data points that may be selected according to a unique key identifier, such as an account, a card or a party. Each entity may have one or more related data points.

As used herein, the term "data point" refers to a transaction.

As used herein, the term "big-data" refers to a collection of data that is huge in volume and continues to grow with time that no existing tool can process it in a reasonable amount of time.

According to some embodiments of the current disclosure, representative sampling from big-data may be performed by clustering. The underlying reasoning is the need for sampling from big-data. Model performance may be inherently dependent on the training dataset. When a model is created over "bad" e.g., unrepresentative, biased and the like, dataset the outcome may be "bad" e.g., biased, unrepresentative or even wrong results of the Machine Learning (ML) models which were trained over this dataset. Therefore, there is a need for a technical solution that will obtain a more representative sample of the population compared to random sampling of the big-data.

Nowadays, the effectiveness of a ML model may be adjusted, by controlling the provided training dataset, with accordance to the mathematical specifications of the underlying algorithm used in this Model. Given, that the ML models are based on decision operations between true and false examples, a statistical segregation over the parameters of a given big-data may be performed.

The ML model may be optimized, by giving it a more representative training dataset, in which not only the minority i.e., rare events, e.g., fraudulent events would be represented sufficiently, but also the selection of the majority entries e.g., non-fraudulent transactions would affect the performance and the effectiveness of our ML model.

Accordingly, there is a need for a technical solution that will provide more representative training dataset, with distinguished groups of negative examples e.g., 'non-fraudulent' data points, together with all related representations of the positive examples, i.e., rare events such as 'fraudulent' data points, to contribute to decision effectiveness of the ML models.

According to some embodiments of the current disclosure, a clustering technique may be applied for selecting representative 'non-fraudulent' data points for a training dataset which may also include entities that have at least one 'fraudulent' data point for a first machine learning model. A second machine learning model may be trained on a dataset that includes randomly selected 'non-fraudulent' data points entities that have at least one 'fraudulent' data point.

According to some embodiments of the current disclosure, to increase accuracy of results of a ML risk prediction model there is a need for a technical solution for generating the ML risk prediction model, by creating an ensemble prediction model from a combination of two ML models. One ML model should be generated and tested based on a clustering selection of a clean dataset that is joined with entities that have at least one fraud data point and the second ML model should be generated and tested based on randomly selected clean data points that are joined with entities that have at least one fraud data point. Then, the needed technical solution has to compare the detection efficacy between them and ensure a smart and efficient usage of the hidden knowledge in the available training dataset.

According to some embodiments of the current disclosure, according to a preconfigured approach, combining, the first machine learning model and the second machine learning to an ensemble machine learning model for risk prediction.

The applied clustering technique improves the accuracy of the combined machine learning risk detection model because the data is more representative.

By using the two ensembled models' evaluation attitude, a comparison factor may be calculated, relying on the differences of both machine learning models predictions.

Figure 1A:
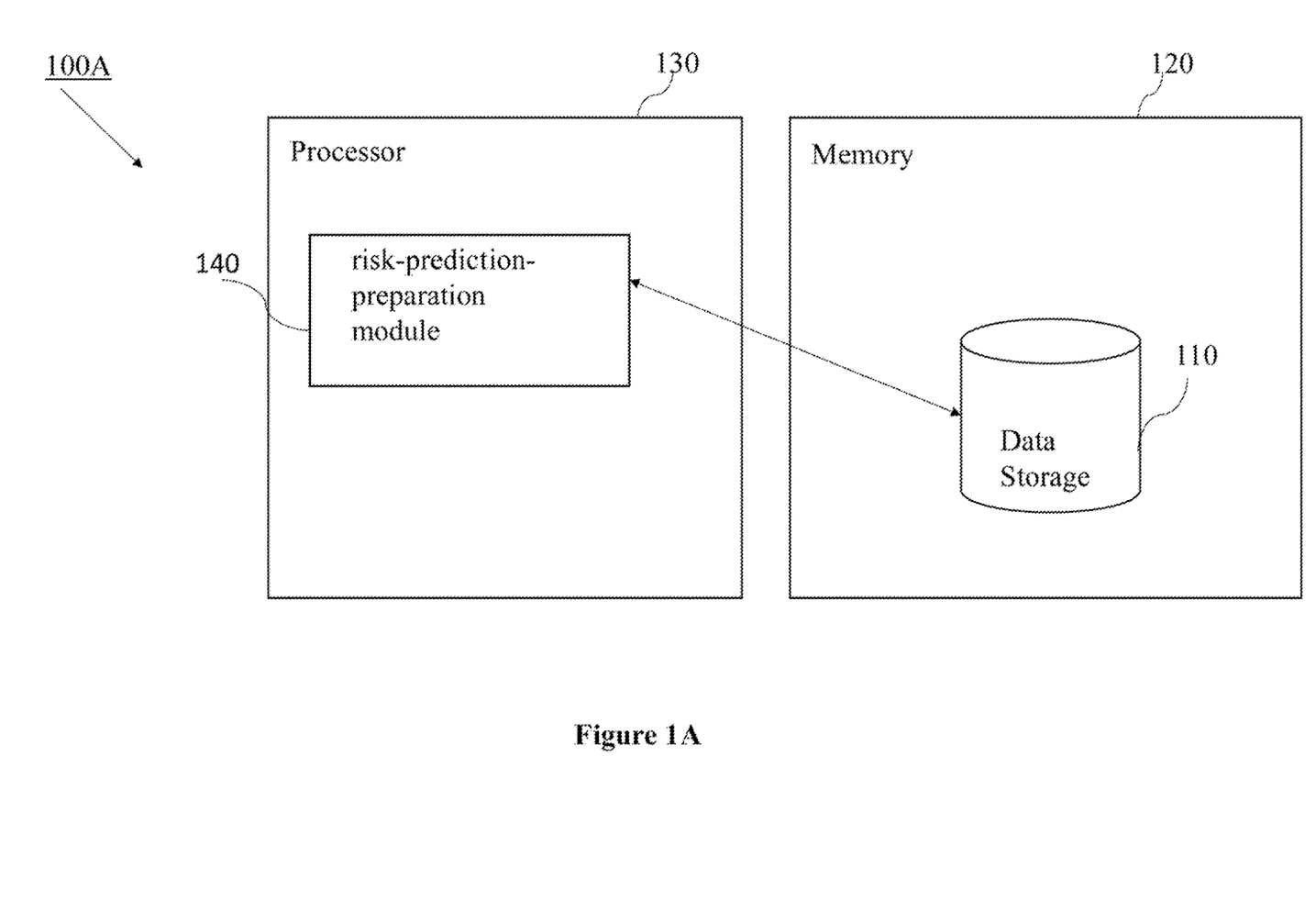
FIG. 1A schematically illustrates a computerized-system for generating a risk prediction model, in accordance with some embodiments of the present disclosure.

FIG. 1A schematically illustrates a computerized-system 100A for generating a risk prediction model, in accordance with some embodiments of the present disclosure.

According to some embodiments of the current disclosure, a computerized-system, such as computerized-system 100A may include a memory 120 to store a data storage a data storage of transactions having data points labeled as 'non-fraudulent' and data points labeled as 'fraudulent', such as data storage 110.

According to some embodiments of the current disclosure, each data point in the data storage, such as data storage 110 may be a record of a financial transaction.

Figure 2A:
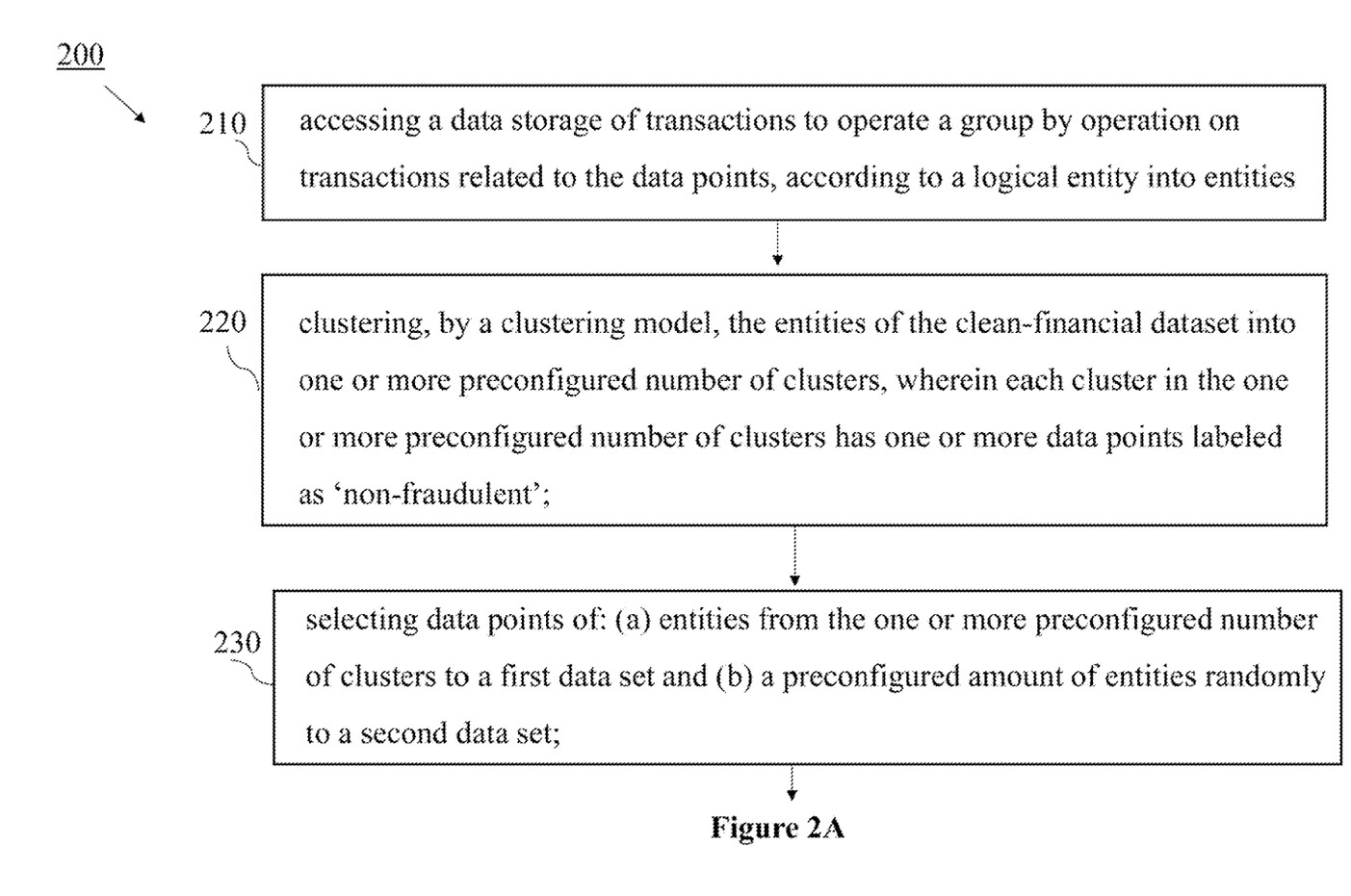
FIGS. 2A-2B are a high-level workflow of a risk-prediction-preparation module, in accordance with some embodiments of the present disclosure.
Figure 2B:
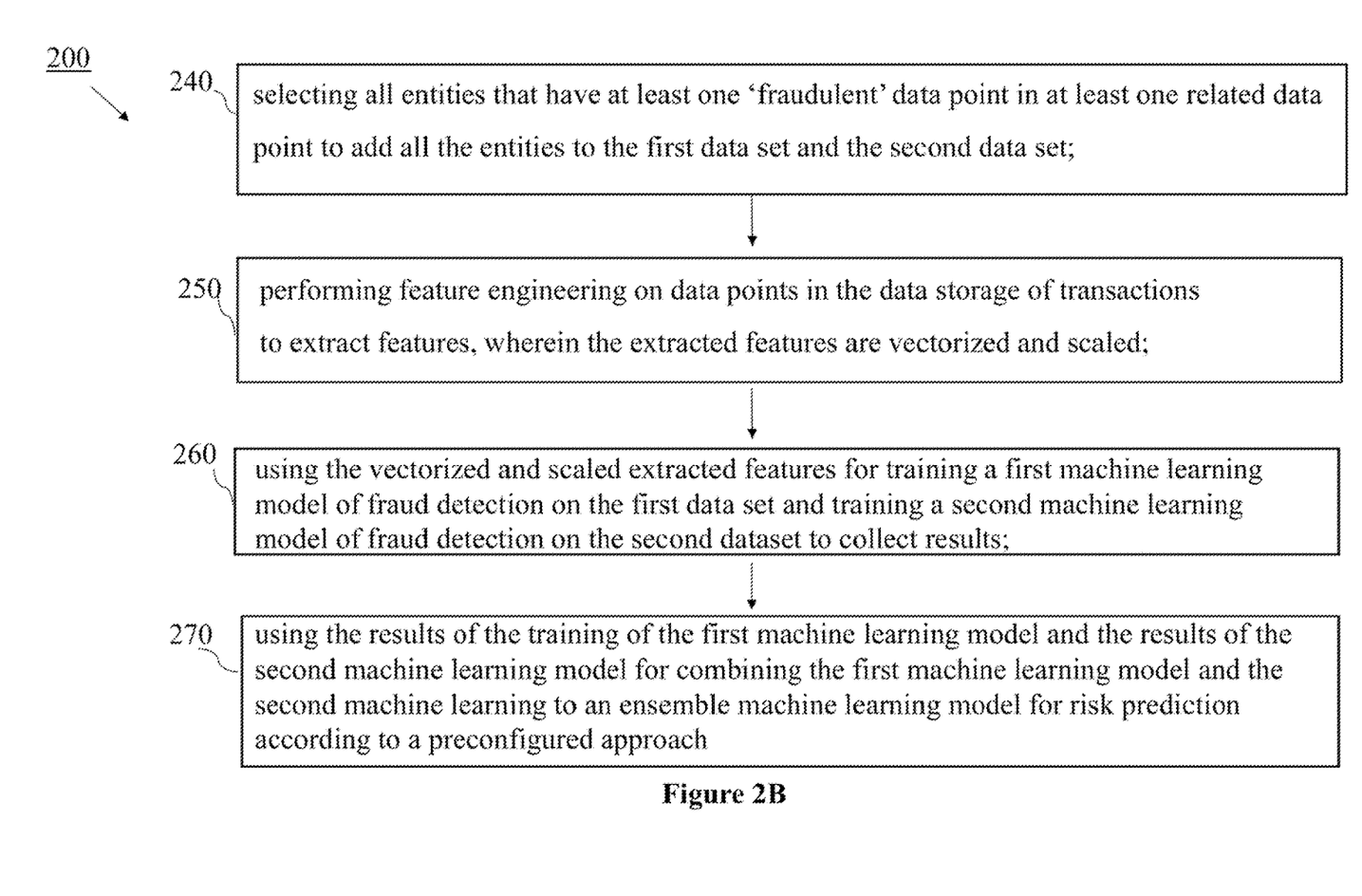

According to some embodiments of the current disclosure, a processor, such as processor 130 may operate a risk-prediction-preparation module, such as risk-prediction-preparation module and such as risk-prediction-preparation module 200 in FIGS. 2A-2B.

According to some embodiments of the current disclosure, the risk-prediction-preparation module such as risk-prediction-preparation module and such as risk-prediction-preparation module 200 in FIGS. 2A-2B may be operated to generate a risk prediction model. The generated risk prediction model may be operating in production environment.

According to some embodiments of the current disclosure, feature engineering is a process of using domain knowledge to extract features from raw data.

According to some embodiments of the current disclosure, the risk-prediction-preparation module, such as risk-prediction-preparation module and such as risk-prediction-preparation module 200 in FIGS. 2A-2B may be configured to: (i) access the data storage of transactions to operate a group by operation on entities related to the data points, according to a logical entity into entities; (ii) cluster, by a clustering model, the entities of the clean-financial dataset into one or more preconfigured number of clusters, wherein each cluster in the one or more preconfigured number of clusters has one or more data points labeled as 'non-fraudulent'; (iii) select data points of: (a) entities from the one or more preconfigured number of clusters to a first data set and (b) a preconfigured amount of entities randomly to a second data set; (iv) select all entities that have at least one 'fraudulent' data points in at least one related data point to add all the entities to the first data set and the second data set; (v) perform feature engineering on data points in the data storage of transactions to extract features, wherein the extracted features are vectorized and scaled; (vi) use the vectorized and scaled extracted features to train a first machine learning model of fraud detection on the first data set and to train a second machine learning model of fraud detection on the second dataset to collect results; and (vii) use the results of the training of the first machine learning model and the results of the second machine learning model to combine the first machine learning model and the second machine learning to an ensemble machine learning model for risk prediction, according to a preconfigured approach.

According to some embodiments of the current disclosure, the first machine learning model and the second machine learning model may be based on algorithms such as XGBoost, multiple linear regression, logistic regression, score-cards and the like.

Figure 1B:
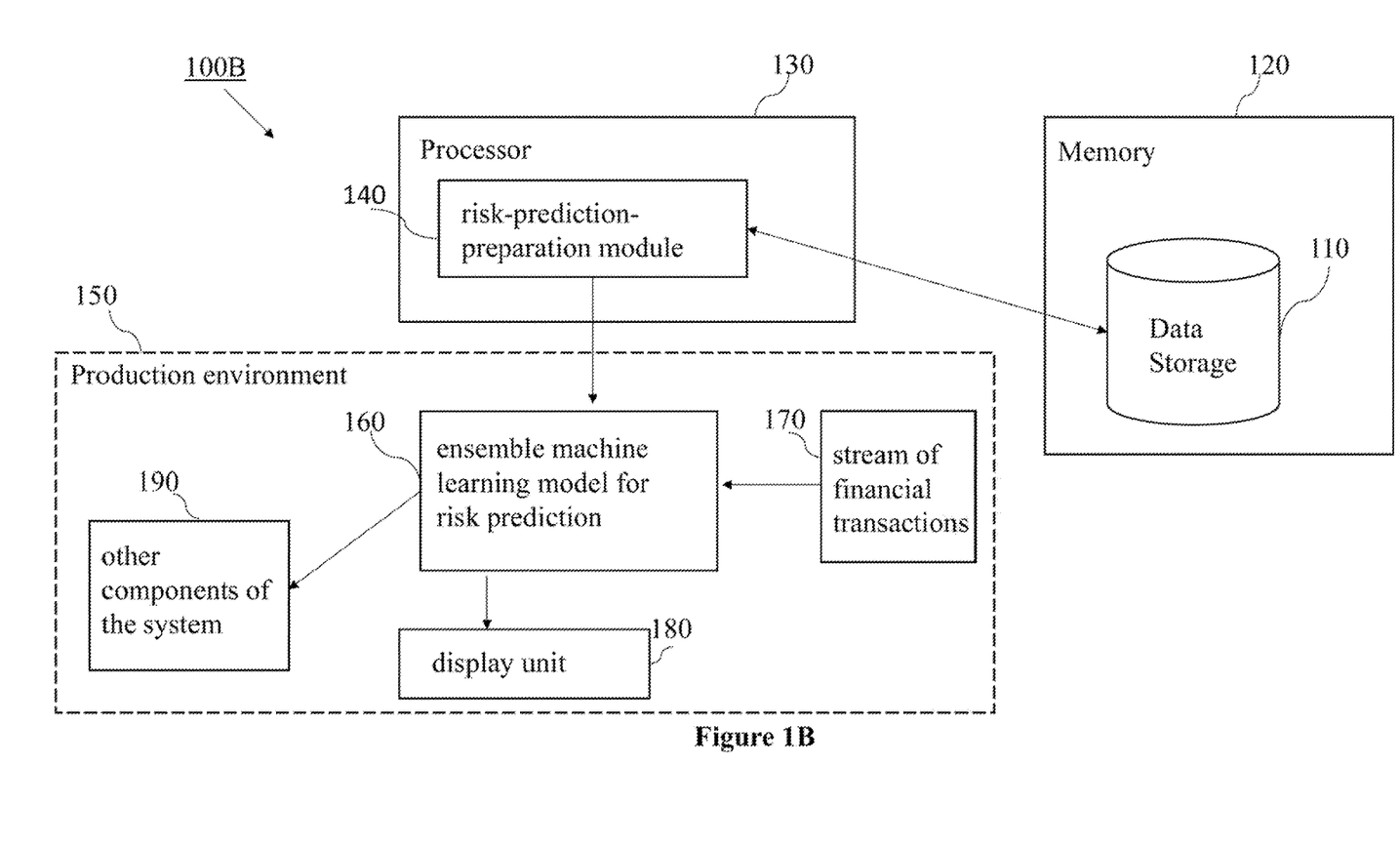
FIG. 1B schematically illustrates a computerized-system for generating a risk prediction model and its implementation in production environment, in accordance with some embodiments of the present disclosure.

FIG. 1B schematically illustrates a computerized-system 100B for generating a risk prediction model and its implementation in production environment, in accordance with some embodiments of the present disclosure.

According to some embodiments of the current disclosure, each data point in the data storage, such as data storage 110 may be a record of a financial transaction.

In machine learning models field, ensemble methods use multiple learning algorithms to obtain better predictive performance of the machine learning models, than could be obtained from the machine learning algorithms alone. In the process of ensemble modeling multiple diverse models are generated for prediction by using e.g., different training datasets. An ensemble model, such as such as ensemble machine learning model for risk prediction 160 is an aggregation of each base model and results of the training datasets for a stream of financial transactions i.e. data points in real time.

According to some embodiments of the current disclosure, computerized-system 100A including memory 120, data storage 110, processor 130 and risk-prediction-preparation module 140, as described above may forward the generated ensemble machine learning model for risk prediction, such as ensemble machine learning model for risk prediction 160 to a production environment, such as production environment 150.

According to some embodiments of the current disclosure, in production environment 150, a risk prediction model, such as ensemble machine learning model for risk prediction 160 may be operated on a stream of financial transactions 170 in real time to predict for each financial transaction the probability that the transaction i.e., data point is fraud and to display, via a display unit, such as display unit 180, financial transactions that the risk prediction model such as ensemble machine learning model for risk prediction 160 identifies as 'risky'.

According to some embodiments of the current disclosure, the risk prediction model, such as ensemble machine learning model for risk prediction 160 may further forward the probability that the transaction i.e., data point is fraud to other components of the system 190.

According to some embodiments of the current disclosure, in the computerized-system 100 a computerized-method may include: (i) testing the ensemble machine learning model for risk prediction on a set of financial transactions each tagged with a risk score of 'non-fraudulent' or 'fraudulent' to yield a prediction result as to each financial transaction; (ii) comparing the yielded prediction result to a preconfigured threshold to determine the yielded prediction result as 'fraudulent' when the yielded prediction result is above the preconfigured threshold and determine the yielded prediction result as 'non-fraudulent' when the yielded prediction result is below the preconfigured threshold; (iii) comparing the determined yielded prediction result with the tagged risk score of the financial transaction to find errors in the yielded prediction result of each financial transaction in the set of financial transactions.

FIGS. 2A-2B are a high-level workflow of a risk-prediction-preparation module 200, in accordance with some embodiments of the present disclosure.

According to some embodiments of the current disclosure, in a computerized-system such as computerized system 100 in FIG. 1, having a data storage of financial transactions, such as data storage 110, which is having financial transaction i.e., data points labeled as 'non-fraudulent' and data points labeled as 'fraudulent', operating by the processor the risk-prediction-preparation module 200.

According to some embodiments of the current disclosure, operation 210 may comprise accessing a data storage of transactions to operate a group by operation on transactions related to the data points, according to a logical entity, into entities.

According to some embodiments of the current disclosure, the grouping by operation may be performed to detect a deeper, or hidden resemblance between different groups of entities, in order to select more representative and versatile dataset. It is referred to as calculation of the "entity statistics".

A domain expert is a person with special knowledge in a particular area. According to some embodiments of the current disclosure, the logical entity may be determined by a domain expert and may be selected from at least one of: account, card and party or any other unique key identifier.

According to some embodiments of the current disclosure, operation 220 may comprise clustering, by a clustering model, the entities of a clean-financial dataset into one or more preconfigured number of clusters. Each cluster in the one or more preconfigured number of clusters may have one or more data points labeled as 'non-fraudulent'. The algorithms for the clustering, i.e. the clustering models, may be selected from K-Means clustering, Gaussian Mixture Models (GMM) clustering, Nearest Neighbor (NN) clustering and Hierarchical clustering methods or any other clustering model.

According to some embodiments of the current disclosure, for K-Means clustering algorithm the meta-parameters are Lloyd's or Elkan's, initialization seeds locations, maximum iteration number of the algorithm for a single run, and tolerance. The tolerance is a relative tolerance with regards to Frobenius norm of the difference in the cluster centers of two consecutive iterations to declare convergence, number of initiations. The number of initiations is a number of time that the k-means clustering algorithm will be run with different centroid seeds.

According to some embodiments of the current disclosure, for other clustering methods than K-Means clustering algorithm, additional meta-parameters are used: covariance type for GMM, type of clustering tree algorithm for K-Nearest Neighbors (KNN) algorithm.

According to some embodiments of the current disclosure, the preconfigured number of clusters out of the one or more clusters is determined according to a Grid-Search with Cross-Validation pipeline, using an accuracy score function for classification over the clustering with different hyper-parameters.

According to some embodiments of the current disclosure, the clustering may be iterating one or more times to find the preconfigured number of clusters based on (i) comparison with a Principal Component Analysis (PCA); and (ii) final model results.

According to some embodiments of the current disclosure, the clustering may be based on one or more preconfigured meta-parameters. The one or more preconfigured meta-parameters may be determined based on confusion metrices of trained first and second machine learning models. The confusion matrix aggregates the model performance measures as such we can optimize the met parameters based on final model's performance.

According to some embodiments of the current disclosure, the clustering model is based on a balanced clustering algorithm.

According to some embodiments of the current disclosure, operation 230 may comprise selecting data points of: (a) entities from the one or more preconfigured number of clusters to a first data set and (b) a preconfigured amount of entities randomly to a second data set. An approach of the selecting of data points may be determined by a domain expert or by a weighted and normalized sampling process.

According to some embodiments of the current disclosure, in other words, the selected data points i.e. financial transactions of the (a) entities from the one or more preconfigured number of clusters may yield the first data set and the selected data points, i.e., financial transactions of (b) preconfigured amount of entities randomly may yield the second data set.

According to some embodiments of the current disclosure, the first dataset may be clustered into representing clusters of 'non-fraudulent' data points.

According to some embodiments of the current disclosure, for example, one approach of the selecting of data points may be a weighted selection of data points from all the clusters, and further selection from the data storage, such as data storage 110 in FIG. 1, all related data points to the selected entities. For example, a specified percent of data points from each cluster.

According to some embodiments of the current disclosure, in another example, the approach may be selecting all data points from a specified number of top clusters.

According to some embodiments of the current disclosure, in another example, the approach of the selecting of data points may be the preconfigured amount of data points from each cluster is all the data points in the cluster, when the amount of data points in the cluster is below the preconfigured percentage of data points divided by the preconfigured number of clusters and otherwise the preconfigured amount of data points from each cluster is the preconfigured percentage of data points divided by the preconfigured number of clusters.

According to some embodiments of the current disclosure, an approach of the selecting of data points may be determined by a domain expert or by a weighted and normalized sampling process.

According to some embodiments of the current disclosure, operation 240 may comprise selecting all entities that have at least one 'fraudulent' data point in at least one related data point to add all the entities to the first data set and the second data set. Thus, yielding a first dataset having all entities that have at least one 'fraudulent' data point in at least one related data point and data points from the one or more preconfigured number of clusters and a second dataset having all entities that have at least one 'fraudulent' data point in at least one related data point and data points of the preconfigured amount of entities randomly selected.

According to some embodiments of the current disclosure, the selected data points of the first data set and the second data set may be used as a representative training dataset for the risk prediction model.

According to some embodiments of the current disclosure, the second dataset may be a comparative random dataset which may be of similar size as the first dataset for comparison of the two ML models' performance over the two datasets and their effectiveness.

According to some embodiments of the current disclosure, operation 250 may comprise performing feature engineering on data points in the data storage of transactions, such as data storage 110 in FIG. 1, to extract features. The extracted features may be vectorized and scaled.

According to some embodiments of the current disclosure, the extracted features may be selected from at least one of: key, numeric, categorical and time.

According to some embodiments of the current disclosure, operation 260 may comprise using the vectorized and scaled extracted features for training a first machine learning model of fraud detection on the first data set and training a second machine learning model of fraud detection on the second dataset to collect results.

According to some embodiments of the current disclosure, operation 270 may comprise using the results of the training of the first machine learning model and the results of the second machine learning model for combining the first machine learning model and the second machine learning to an ensemble machine learning model for risk prediction, according to a preconfigured approach.

According to some embodiments of the current disclosure, for example the preconfigured approach may include: (i) performing analysis of the results of the training of the first machine learning model and the results of the training of the second machine learning model; and (ii) comparing results errors performance and calculating a correction factor for a combined voting of the first machine learning model and the second machine learning model to yield a risk prediction model.

For example, the combined voting may be based on a confusion matrix from the first machine learning model, and a confusion matrix from the second machine learning model. The values of the first confusion matrix and the second machine learning model may include values of: True-Positive (TP), True-Negative (TN), False-Positive (FP), False-Negative (FN), According to some embodiments of the current disclosure, in another example, the preconfigured approach may be selected from at least one of: max function, Rectified Linear (ReLU) function, average function, weighted average function or any other function.

It should be understood with respect to any flowchart referenced herein that the division of the illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other embodiments of the illustrated method.

Similarly, it should be understood that, unless indicated otherwise, the illustrated order of execution of the operations represented by blocks of any flowchart referenced herein has been selected for convenience and clarity only. Operations of the illustrated method may be executed in an alternative order, or concurrently, with equivalent results. Such reordering of operations of the illustrated method should be understood as representing other embodiments of the illustrated method.

Different embodiments are disclosed herein. Features of certain embodiments may be combined with features of other embodiments; thus, certain embodiments may be combinations of features of multiple embodiments. The foregoing description of the embodiments of the disclosure has been presented for the purposes of illustration and description. It is not intended to be exhaustive or to limit the disclosure to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the disclosure.

While certain features of the disclosure have been illustrated and described herein, many modifications, substitutions, changes, and equivalents will now occur to those of ordinary skill in the art. It is, therefore, to be understood that the appended claims are intended to cover all such modifications and changes as fall within the true spirit of the disclosure.

What is claimed:

1. A computerized-method for generating a risk prediction model, said computerized-method comprising:
in a computerized-system comprising a processor and a memory, providing to the processor access to a data storage of transactions having data points labeled as 'non-fraudulent' and data points labeled as 'fraudulent' and operating by the processor a risk-prediction-preparation module, said risk-prediction-preparation module comprising:
(i) accessing the data storage of transactions to operate a group by operation on transactions related to the data points, according to a logical entity into entities and filtering entities having no 'fraudulent' data point into a clean-financial dataset;
(ii) clustering, by a clustering model, entities of the clean-financial dataset into one or more preconfigured number of clusters, wherein each cluster in the one or more preconfigured number of clusters has one or more data points labeled as 'non-fraudulent;
(iii) selecting data points of: (a) entities from the one or more preconfigured number of clusters to a first dataset and (b) a preconfigured number of entities randomly to a second dataset;

(iv) selecting all entities that have at least one 'fraudulent' data point in at least one related data point to add all the entities to the first dataset and the second dataset;

(v) performing feature engineering on data points in the data storage of transactions to extract features, wherein the extracted features are vectorized and scaled;

(vi) using the vectorized and scaled extracted features for training a first machine learning model of fraud detection on the first dataset and training a second machine learning model of fraud detection on the second dataset to collect results; and (vii) using the results of the training of the first machine learning model and the results of the second machine learning model for combining the first machine learning model and the second machine learning model to an ensemble machine learning model for risk prediction according to a preconfigured approach, wherein the preconfigured approach comprising:

(i) performing analysis of the results of the training of the first machine learning model and the results of the training of the second machine learning model; and (ii) comparing results errors performance and calculating a correction factor for a combined voting of the first machine learning model and the second machine learning model to yield a risk prediction model.

2. The computerized-method of claim 1, wherein the logical entity is determined by a domain expert.

3. The computerized-method of claim 1, wherein the extracted features are selected from at least one of: key, numeric, categorical and time.

4. The computerized-method of claim 1, wherein the selected data points of the first dataset and the second dataset are used as a representative training dataset for the risk prediction model.

5. The computerized-method of claim 1, wherein the computerized-method further includes operating the ensemble machine learning model for risk prediction, in production environment on a stream of financial transactions to display, via a display unit, financial transactions that the risk prediction model identifies as 'risky'.

6. The computerized-method of claim 1, wherein the preconfigured number of clusters out of the one or more clusters is determined according to a Grid-Search with Cross-Validation pipeline, using an accuracy score function for classification over the clustering with different hyper-parameters.

7. The computerized-method of claim 6, wherein the clustering is iterating one or more times to find the preconfigured number of clusters based on (i) comparison with a Principal component analysis (PCA); and (ii) final model results.

8. The computerized-method of claim 1, wherein an approach of the selecting of data points is determined by a domain expert or by a weighted and normalized sampling process.

9. The computerized-method of claim 1, wherein the clustering is based on one or more preconfigured meta-parameters.

10. The computerized-method of claim 9, wherein the one or more preconfigured meta-parameters are determined based on confusion metrices of trained first and second machine learning models.

11. The computerized-method of claim 10, wherein for K-Means clustering algorithm the meta-parameters are Lloyd's or Elkan's, initialization seeds locations, maximum iteration Number of the algorithm for a single run, tolerance wherein tolerance is a relative tolerance with regards to Frobenius norm of difference in the cluster centers of two consecutive iterations to declare convergence, number of initiations, and wherein the number of initiations is a number of time that the k-means clustering algorithm will be run with different centroid seeds.

12. The computerized-method of claim 10, wherein for other clustering methods than K-Means clustering algorithm, additional meta-parameters are used: covariance type for Gaussian Mixture Model (GMM), type of clustering tree algorithm for K-Nearest Neighbors (KNN) algorithm.

13. The computerized-method of claim 1, wherein the first dataset is clustered into representing clusters of 'non-fraudulent' data points.

14. The computerized-method of claim 1, wherein the preconfigured amount of data points from each cluster is all the data points in the cluster, when the amount of data points in the cluster is below the preconfigured percentage of data points divided by the preconfigured number of clusters and otherwise the preconfigured amount of data points from each cluster is the preconfigured percentage of data points divided by the preconfigured number of clusters.

15. The computerized-method of claim 1, wherein the clustering model is based on a balanced clustering algorithm.

16. The computerized-method of claim 1, wherein each data point in the data storage is a record of a financial transaction.

17. The computerized-method of claim 1, wherein the clustering model is selected from at least one of K-Nearest Neighbors (KNN) classifier, K-means clustering, spectral clustering, Gaussian Mixture Models (GMM) clustering, hierarchical clustering, Hierarchical Density-Based Spatial Clustering of Applications with Noise (HDBSCAN).

18. The computerized-method of claim 1, wherein the logical entity is selected from at least one of: account, card and party or any other unique key identifier.

19. The computerized-method of claim 1, wherein the preconfigured approach is selected from at least one of: max function, Rectified Linear (ReLU) function, average function, weighted average function or any other function.

20. The computerized-method of claim 1, wherein the computerized-method further comprising: (i) testing the ensemble machine learning model for risk prediction on a set of financial transactions each tagged with a risk score of 'non-fraudulent' or 'fraudulent' to yield a prediction result as to each financial transaction; (ii) comparing the yielded prediction result to a preconfigured threshold to determine the yielded prediction result as 'fraudulent' when the yielded prediction result is above the preconfigured threshold and determine the yielded prediction result as 'non-fraudulent' when the yielded prediction result is below the preconfigured threshold; and (iii) comparing the determined yielded prediction result with the tagged risk score of the financial transaction to find errors in the yielded prediction result of each financial transaction in the set of financial transactions.

21. A computerized-system for generating a risk prediction model, said computerized-system comprising:

a processor;

a memory;

a data storage of transactions having data points labeled as 'non-fraudulent' and of data points labeled as 'fraudulent', said processor is receiving access to the data storage and operating a risk-prediction-preparation module, said risk-prediction-preparation module is configure to:

(i) access the data storage of transactions to operate a group by operation on entities related to the data points, according to a logical entity into entities and filtering entities having no 'fraudulent' data point into a clean-financial dataset;
(ii) cluster, by a clustering model, the entities of the clean-financial dataset into one or more preconfigured number of clusters, wherein each cluster in the one or more preconfigured number of clusters has one or more data points labeled as 'non-fraudulent';
(iii) select data points of: (a) entities from the one or more preconfigured number of clusters to a first dataset and (b) a preconfigured number of entities randomly to a second dataset;
(iv) select all entities that have at least one 'fraudulent' data point in at least one related data point to add all the entities to the first dataset and the second dataset;
(v) perform feature engineering on data points in the data storage of transactions to extract features, wherein the extracted features are vectorized and scaled;
(vi) use the vectorized and scaled extracted features to train a first machine learning model of fraud detection on the first dataset and to train a second machine learning model of fraud detection on the second dataset to collect results; and
(vii) use the results of the training of the first machine learning model and the results of the second machine learning model to combine the first machine learning model and the second machine learning model to an ensemble machine learning model for risk prediction, according to a preconfigured approach,
wherein the preconfigured approach comprising:
(i) performing analysis of the results of the training of the first machine learning model and the results of the training of the second machine learning model; and
(ii) comparing results errors performance and calculating a correction factor for a combined voting of the first machine learning model and the second machine learning model to yield a risk prediction model.

\* \* \* \* \*